US008623505B2

(12) United States Patent
Gotanda et al.

(10) Patent No.: US 8,623,505 B2

(45) Date of Patent: Jan. 7, 2014

(54) DECOLORIZABLE COLOR DEVELOPING PARTICLE COMPRISING COLOR COMPONENTS PRESENT IN CONCENTRATION GRADIENT

(75) Inventors: Takeshi Gotanda, Yokohama (JP); Satoshi Takayama, Kawasaki (JP); Yumiko Sekiguchi, Kawasaki (JP); Kenji Sano, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/223,703

(22) Filed: Sep. 1, 2011

(65) Prior Publication Data

US 2012/0270975 A1 Oct. 25, 2012

(30) Foreign Application Priority Data

Apr. 20, 2011 (JP) ................................ 2011-094299

(51) Int. Cl.
*B32B 5/16* (2006.01)
*B32B 5/00* (2006.01)
*C09D 7/00* (2006.01)
*C09D 11/02* (2006.01)

(52) U.S. Cl.
USPC ..................... 428/402; 106/31.01; 106/31.32; 106/31.3; 106/31.65; 428/32.34; 428/218

(58) Field of Classification Search
CPC ............. B32B 5/16; B35B 5/00; C09D 7/00; C09D 11/02
USPC ............ 503/217, 219, 225; 106/31.01, 31.32, 106/31.6, 31.65; 428/32.34, 218, 402
See application file for complete search history.

(56) References Cited

U.S. PATENT DOCUMENTS

| | | | | |
|---|---|---|---|---|
| 5,922,115 | A * | 7/1999 | Sano et al. | 106/31.32 |
| 6,203,603 | B1 * | 3/2001 | Takayama et al. | 106/31.16 |
| 6,313,066 | B1 * | 11/2001 | Takayama | 503/201 |
| 6,326,332 | B1 * | 12/2001 | Takayama | 503/201 |
| 7,276,465 | B2 * | 10/2007 | Takayama et al. | 503/221 |
| 7,291,436 | B2 * | 11/2007 | Nakamura et al. | 430/110.2 |
| 7,354,885 | B2 * | 4/2008 | Takayama et al. | 503/214 |
| 8,289,352 | B2 * | 10/2012 | Vartanian et al. | 347/110 |

FOREIGN PATENT DOCUMENTS

| | | |
|---|---|---|
| CN | 1773382 | 5/2006 |
| EP | 0 980 028 A1 | 2/2000 |
| EP | 1 655 638 A1 | 5/2006 |
| JP | 2001-271011 | 10/2001 |
| JP | 2010-077376 | 4/2010 |

OTHER PUBLICATIONS

European Search Report for European Application No. 11179143.0 dated Jul. 20, 2012.
Chinese Office Action for Chinese Application No. 201110256333.7 mailed on Jul. 25, 2013.

* cited by examiner

*Primary Examiner* — Hoa (Holly) Le
(74) *Attorney, Agent, or Firm* — Turocy & Watson, LLP

(57) ABSTRACT

According to one embodiment, decolorizable color developing particle includes 41 to 50% by mass of a color material relative to the total amount, while the rest being a binder. The color material contains an amount $m_L$ of a color developing compound and an amount $m_D$ ($m_D$<$m_L$) of a developer. Island portions rich in the color material are distributed within sea portion rich in the binder.

13 Claims, 1 Drawing Sheet

DECOLORIZABLE COLOR DEVELOPING PARTICLE COMPRISING COLOR COMPONENTS PRESENT IN CONCENTRATION GRADIENT

CROSS-REFERENCE TO RELATED APPLICATIONS

This application is based upon and claims the benefit of priority from prior Japanese Patent Application No. 2011-094299, filed Apr. 20, 2011, the entire contents of which are incorporated herein by reference.

FIELD

Embodiments described herein relate generally to a decolorizable color developing particle.

BACKGROUND

Color developing particles containing a color developing compound and a developer have been known. These color developing particles are erasable image forming materials which develop a color when the level of interaction between the color developing compound and the developer increases and are decolored when the level of interaction reduces.

These color developing particles are required to exhibit sufficiently high color optical density when developing a color. The color optical density needs to be maintained at a high level until decoloring is required.

DETAILED DESCRIPTION

Figure 1:
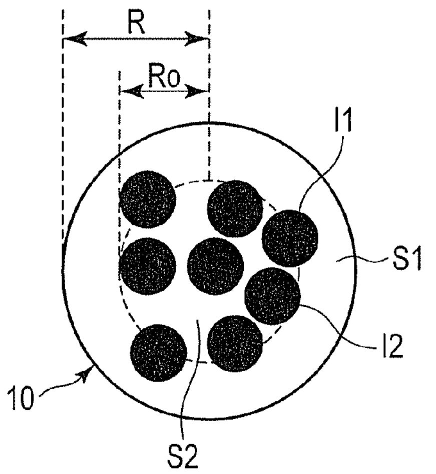
FIG. 1 is a schematic diagram for explaining a structure of a decolorizable color developing particle according to an embodiment.

In general, according to one embodiment, decolorizable color developing particle includes 41 to 50% by mass of a color material relative to the total amount, while the rest being a binder. The color material contains an amount $m_L$ of a color developing compound and an amount $m_D$ ($m_D<m_L$) of a developer. Island portions rich in the color material are distributed within sea portion rich in the binder.

Hereinafter, embodiments will be specifically described.

The decolorizable color developing particles of the present embodiment contain a color material, containing a color developing compound and a developer, and a binder. The amount of the color material is 41 to 50% by mass relative to the total amount, and the amount of the developer is lower than the amount of the color developing compound. Furthermore, the color developing particles of the present embodiment include sea portion rich in the binder and island portions rich in the color material that are distributed within the sea portion.

The present inventors have discovered that the color developing particles of the present embodiment provided with these conditions exhibit excellent heat resistance and, as a result, are capable of retaining the color optical density at a high level.

In the decolorizable color developing particles of the present embodiment, the island portions rich in the color material are distributed within the sea portion rich in the binder. Distribution state of these color developing particles will be explained with reference to FIG. 1. The radius of a color developing particle is defined as R, and an arbitrary distance from the center is defined as $R_0$. Within a cross-sectional region (radius $R_1>R_0$) outside this arbitrary distance $R_0$, the total area of the island portions rich in the color material is defined as $I_1$, and the area of the sea portion rich in the binder is defined as $S_1$. In addition, within a cross-sectional region (radius $R_2<R_0$) inside the arbitrary distance $R_0$, the total area of the island portions rich in the color material is defined as $I_2$, and the area of the sea portion rich in the binder is defined as $S_2$.

The following relationship is established between these areas.

$$(I_1/S_1)<(I_2/S_2)$$

$(I_1/S_1)$ corresponds to the area ratio of island portions rich in the color material within a region (having a radius of $R_1$) outside the arbitrary distance $R_0$, and $(I_2/S_2)$ corresponds to the area ratio of island portions rich in the color material within a region (having a radius of $R_2$) inside the arbitrary distance $R_0$. The area ratio of island portions within the inside region is higher than the area ratio of island portions within the outside region. Throughout the entire region of the color developing particles according to the present embodiment, the area ratio of island portions rich in the color material is higher within the inside region than in the outside region. It can be said that the composition of the color developing particles according to the present embodiment has an inclined structure.

In the color developing particles according to the present embodiment, the smaller the arbitrary distance $R_0$, the higher the ratio of island portions rich in the color material. For example, within a region where the distance $R_0$ is about 30% or less of the radius R of the color developing particles, the $(I_1/S_1)$ value within a region outside this $R_0$ is about 0.4 to 0.6, while the $(I_2/S_2)$ value within a region inside this $R_0$ is about 0.7 to 0.9. In this case, the $(I_2/S_2)$ value is about 1.1 to 2.3 times the $(I_1/S_1)$ value.

On the other hand, the greater the arbitrary distance $R_0$, the higher the ratio of sea portion rich in the binder. For example, within a region where the distance $R_0$ is about 80% or more of the radius R of the color developing particles, the $(I_1/S_1)$ value within a region outside this $R_0$ is about 0.2 to 0.5, while the $(I_2/S_2)$ value within a region inside this $R_0$ is about 0.6 to 0.9. In this case, the $(I_2/S_2)$ value is about 1.2 to 4.5 times the $(I_1/S_1)$ value.

The area and shape of these island portions and sea portion can be verified, for example, by using a transmission electron microscope (TEM) or a scanning electron microscope (SEM). The shape of the individual island portion in the color developing particles is generally circular or elliptic. The area per one island portion is about 0.01 to 5 $\mu m^2$.

Each area can be determined, for example, by the following method. First, the image obtained by the measurement using a TEM or an SEM at 7,000-times magnification is binarized by expressing the island portions and the sea portion in two colors (for example, black and white) using generally available software. Then, the binarized image is processed using software so that the area for each color can be determined.

As the color developing compound in the color developing particles of the present embodiment, for example, electron donating organic materials such as leucoauramines, diarylphthalides, polyarylcarbinols, acylauramines, arylauramines, rhodamine B lactams, indolines, spiropyrans and fluorans can be used.

Specific examples of the color developing compounds include the following compounds. They are, Crystal Violet Lactone (CVL), Malachite Green Lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chloro-6-(diethylamino)fluoran, 7-(N,N-dibenzylamino)-3-(N,N-diethylamino)fluoran, 3,6-bis(diethylamino)fluoran-γ-(4'-nitro) anilinolactam, 3-diethylaminobenzo[a]-fluoran, 3-dietylamino-6-methyl-7-aminofluoran, 3-diethylamino-7-xylidinofluoran, 3-(4-diethylamino-2-ethoxyphenyl)-3-(1-ethyl-2-methylindol-3-yl)-4-azaphthalide, 3-(4-diethylaminophenyl)-3-(1-ethyl-2-methylindol-3-yl)phthalide, 3-diethylamino-7-chloroanilinofluoran, 3-diethylamino-7,8-benzofluoran, 3,3-bis(1-n-butyl-2-methylindol-3-yl)phthalide, 3,6-dimethylethoxyfluoran, 3-diethylamino-6-methoxy-7-aminofluoran, diethylphosphoromethyl (DEPM), adenosine triphosphate (ATP), 2-(phenylamino)-3-methyl-6-[ethyl(p-tolyl)amino]spiro[9H-xanthen-9,1'(3'H)-isobenzofuran-3'-one (ETAC), 2-(2-chloroanilino)-6-dibutylaminofluoran, Crystal Violet Carbinol, Malachite Green Carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benzo-6-diethylaminofluoran, 3,6-di-p-toluidino-4,5-dimethylfluoran-phenylhydrazide-γ-lactam, 3-amino-5-methylfluoran, and the like.

As a color developing compound, Crystal Violet Lactone (CVL) is particularly preferred for its availability and low cost.

As a color developing compound, a single compound may be used alone, or two or more types of compounds may be used in combination. When the amount $m_L$ for the color developing compound within the color material exceeds 30 mol % and about 70 mol % or less, desired effects can be achieved without any problems. By appropriately selecting the color developing compound, various colors can be developed and can also be easily adopted in color applications.

As the developer in the color developing particles of the present embodiment, for example, phenols, metal phenolates, metal carboxylates, benzophenones, sulfonic acids, sulfonates, phosphoric acids, metal phosphates, acidic phosphoric esters, acidic phosphoric ester metal salts, phosphorous acids, metal phosphites, and the like can be used.

Specific examples of the developers are listed below. They are, gallic acid, gallic acid esters such as methyl gallate, ethyl gallate, n-propyl gallate, propyl gallate, and butyl gallate; dihydroxybenzoic acids such as 2,3-dihydroxybenzoic acid and methyl 3,5-dihydroxybenzoate, and the esters thereof; hydroxyacetophenones such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; hydroxybenzophenones such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and the like.

In addition, polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol, and methylenetris-p-cresol, and the like may also be used.

As a developer, 2,4-dihydroxybenzophenone is particularly preferred for its availability and low cost.

As a developer, a single compound may be used alone, or two or more types of compounds may be used in combination. The amount $m_D$ for the developer within the color material may be from 30 mol % or more and less than 70 mol %, although the amount $m_D$ for the developer is smaller than the amount $m_L$ for the color developing compound. When the amount of the developer is smaller than the amount of the color developing compound, variations in the glass transition temperature (Tg) of the obtained color developing particles may be reduced. For this reason, it becomes possible to increase the amount of color material containing a color developing compound and a developer, as compared to the composition with large developer amount.

However, when the developer amount is too small, the level of coloration by the color developing compound becomes inadequate. The amount $m_D$ for the developer is preferably 0.7 to 0.9 times, and more preferably 0.75 to 0.8 times, as large as the amount $m_L$ for the color developing compound.

It should be noted that when the glass transition temperature is reduced to a large extent, the binder reaches a temperature not less than the glass transition point at a relatively low temperature. Within this temperature range, low-molecular-weight components such as the color developing compound and the developer easily migrate within the binder. When the color developing particles are applied to toner, the particles are immersed in hot water. When the particles with a low glass transition temperature are immersed in hot water, the color developing compound and the developer easily dissociate, thereby reducing the optical density of the ultimately obtained toner.

Similar problems to those in the case of toner also arise when the color developing particles are applied to aqueous ink. Dissociation of the color developing compound and the developer gradually proceeds even at room temperature, and it becomes difficult to maintain the optical density of the color developing particles for an extended period.

As described above, the color developing particles of the present embodiment exhibit excellent heat resistance since variations in the glass transition temperature are small. As a result, it has become possible to maintain the optical density for an extended period. Therefore, the color developing particles according to the present embodiment can also be suitably used for toner and aqueous ink.

The color material in the color developing particles of the present embodiment is constituted by the color developing compound and the developer. The amount of the color material in the color developing particles is 41 to 50% by mass relative to the total amount. The remaining portion of the color developing particles is constituted by the binder. The amount of the color material in the color developing particles is more preferably 43 to 47% by mass relative to the total amount.

The amounts of the color developing compound and the developer contained in the color developing particles can be determined by gel permeation chromatography (GPC). The binder, the color developing compound and the developer are dissolved in an eluent, and the obtained solution is used for the determination. Examples of the eluents include tetrahydrofuran (THF), chloroform, dimethylformamide (DMF), dichlorobenzene (DCB), and the like. The obtained solution is quantified by the GPC method, and each component can be observed as an individual peak.

In the present embodiment, 3 peaks are mainly observed. In principle, the greater the molecular weight, the shorter the retention time. A peak originating from the binder, a peak originating from the color developing compound and a peak originating from the developer are detected. For example, the binder component is observed as a peak having an Mw of 1,000 or more, whereas the color developing compound and the developer are observed as peaks having an Mw of 1,000 or less. Note that when each component is constituted from a plurality of materials, the number of peaks increase in response to the number of materials.

In the peak chart obtained by the GPC method, a line connecting the positions with no peak (i.e., a detected peak) is used as a baseline. The area for each peak is calculated by using this baseline as a reference. In this manner, the concentrations of the color developing compound and the developer contained in the color developing particles can be determined from the area ratio for the obtained peaks. When several peaks are overlapping, they are separated into an individual peak to calculate each area at a position where the overlapping degree is minimal (a portion serving as a trough between peaks). It should be noted that the molecular structure for each peak can be identified from the fragment ion if the mass spectrum is measured following the separation of each peak.

The color density increases as the non-polarity of the binder increases. Examples of the atomic group for increasing the polarity include an ether group (—O—), a carbonyl group (—C(═O)—), an ester group, and the like. The amount of the polar group within the binder is preferably about ⅓ or less of the molecular weight.

Examples of such binders include polystyrene, polystyrene derivatives, copolymers of styrene, and the like. These binders can be obtained, for example, by polymerizing a styrene-based monomer selected from the group consisting of styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene.

Examples of copolymers of styrene include styrene/butadiene copolymers, styrene/p-chlorostyrene copolymers, styrene/propylene copolymers, styrene/butadiene rubbers, and the like.

As the binder, styrene/butadiene copolymers are particularly preferred due to their high thermal stability.

The color developing particles of the present embodiment can be produced, for example, by the following method. First, the color developing compound, the developer and the binder are added to a solvent to prepare a solution. The solvent can be selected from, for example, toluene, hexane, acetone, or the like. This solution is sprayed into a gaseous phase to form droplets. The solvent is separated from the obtained droplets to form the decolorizable color developing particles, and the color developing particles are then collected. The solvent is evaporated and separated from the free surface of the droplets.

Although there are no particular limitations on the gas species in the gaseous phase, the oxygen concentration is preferably 5% or less in order to avoid the risk of ignition or explosion of the droplets. With respect to the gas species, a nonflammable gas or a rare gas is preferred. Specific examples thereof include nitrogen gas, carbon dioxide, rare gas, helium gas, neon gas, argon gas, and the like. These gas species can be used alone, or two or more types thereof may be mixed for use.

There are no particular restrictions on the spraying method. However, more specifically, a two-fluid nozzle, a one fluid nozzle, an ultrasonic nozzle, a piezoelectric nozzle, a thermal head-type nozzle, an electrostatic spraying nozzle, and the like can be employed. A two-fluid nozzle and an electrostatic spraying nozzle are particularly suitable because the size of the produced particles is small.

Drying and color development proceed at the same time inside the droplets immediately after spraying, and the solvent evaporates from the free surface of the droplets. At this time, the binder which is a slowly diffusing resin component is concentrated outside the droplets. On the other hand, the color developing compound and the developer that diffuse rapidly migrate to the inside of the droplets. In the color developing particles obtained following drying, the number of island portions rich in the color material containing a color developing compound and a developer increases on the inner side so as to form an inclined structure.

The color developing particles of the present embodiment preferably have a glass transition temperature of 87.5° C. or more. The color development level of these color developing particles can be maintained when the temperature is not less than the above temperature. The glass transition temperature of the color developing particles can be measured, for example, by differential scanning calorimetry (DSC) or the like. Note that the rate of temperature increase in the case of the measurement by DSC is 10° C./min.

Specific examples of the decolorizable color developing particles are shown below.

The color material containing the color developing compound and the developer, as well as the binder were dissolved in a solvent in accordance with the formulations indicated in Table 1 shown below to obtain solutions Nos. 1 to 6. The mol % for the color developing compound and the developer refers to the percentage with respect to the number of moles within the color material as a whole. The amount of the dissolved color material (parts by mass) corresponds to the total amount (% by mass) of the color material in the ultimately obtained color developing particles. All solutions were prepared by dissolving the components so that the total amount thereof is 1.25 g/100 ml.

TABLE 1

| | 1 | 2 | 3 | 4 | 5 | 6 |
|---|---|---|---|---|---|---|
| Color developing compound | CVL | CVL | CVL | CVL | CVL | CVL |
| Developer | 2,4-DHBP | EG | EG | EG | EG | EG |
| Color material (parts by mass) | 30 | 41 | 45 | 50 | 70 | 50 |
| Binder (parts by mass) | 70 | 59 | 55 | 50 | 30 | 50 |
| Color developing compound $m_L$(mol %) | 70 | 55 | 60 | 60 | 60 | 30 |
| Developer $m_D$(mol %) | 30 | 45 | 40 | 60 | 40 | 70 |
| $m_D/m_L$ | 0.429 | 0.818 | 0.667 | 0.667 | 0.667 | 2.333 |

The used materials are summarized below.

Color developing compound: Crystal Violet Lactone CVL (leuco dye manufactured by Yamada Kagaku Co., Ltd.)

Developer: 2,4-dihydroxybenzophenone (2,4-DHBP) Ethyl gallate (EG)

Binder: polystyrene (brand G320C manufactured by Toyo Styrol Co., Ltd.)

Solvent: a mixed solvent of acetone (70% by mass) and toluene (30% by mass)

Each solution was sprayed in a nitrogen atmosphere using a spray dryer (B-290 type, manufactured by Sibata Scientific Technology Ltd.) to obtain color developing particles Nos. 1 to 6. The ambient temperature where the spraying was conducted was controlled between 55 and 60° C. by external heating. The temperature control was conducted using a heater. The average particle size for the obtained color developing particles was about 200 to 400 nm when determined by a particle size distribution measuring apparatus. The radius R for the color developing particles was about 100 to 200 nm.

When the obtained color developing particles were observed using a TEM, in the color developing particles Nos. 2 to 6, it was confirmed that the island portions rich in the color material were are distributed within the sea portion rich in the binder.

With respect to each color developing particle, the distance $R_0$ was set to 50% of the radius R, so as to define an outside region and an inside region, as shown in FIG. 1. Area $I_1$ of the island portions and area $S_1$ of the sea portion in the outside region were determined from the image obtained from the TEM to calculate the area ratio ($I_1/S_1$) in the outside region. With respect to the inside region, area $I_2$ of the island portions and area $S_2$ of the sea portion were determined in the same manner to calculate the area ratio ($I_2/S_2$) in the inside region.

Moreover, Tg of each color developing particle was measured by DSC. The results are summarized in Table 2 shown below together with the area ratio.

TABLE 2

| | 1 | 2 | 3 | 4 | 5 | 6 |
|---|---|---|---|---|---|---|
| $I_1/S_1$ | — | 0.01 | 0.1 | 0.1 | 0.3 | 0.4 |
| $I_2/S_2$ | — | 0.5 | 0.7 | 0.7 | 0.8 | 0.5 |
| Tg | 60 | 87.5 | 88 | 89 | 70 | 60 |

As shown in the Table 2 above, in the color developing particles Nos. 2 to 6, it was confirmed that the area ratio for the island portions was higher in the inside region than in the outside region, although the presence of island portions was not confirmed in the color developing particles, No. 1. Tg for the color developing particles Nos. 2 to 4 was as high as 87.5° C. or even higher. In these particles, the total amount of the color material in the color developing particle is within a range from 41 to 50% by mass, and the amount of the developer is more than the amount of the color developing compound. In those cases where the total amount of the color material in the color developing particles was 30% by mass (No. 1) and 70% by mass (No. 5), Tg was 60 and 70° C., respectively.

When the amount of the developer is more than the amount of the color developing compound, it has been shown in the example of No. 6 that Tg is 60° C. even if the total amount of the color material in the color developing particles is 50% by mass.

Then, the color optical density of each color developing particle was measured using a colorimeter (manufactured by Konica Minolta Holdings, Inc.). It is required that the color optical density be 0.5 or more.

Moreover, an accelerated test was conducted to examine the coloration retention of each color developing particle. Each color developing particle was dispersed in Vylonal MD-1200 (Toyobo Co., Ltd.), and then immersed in water at 70° C. for 15 minutes. Vylonal is used as a dispersing agent. Initial optical density was measured for each color developing particle and defined as the optical density ($D_0$) before fading. In addition, the optical density following the treatment was measured and defined as the optical density ($D_1$) after fading. The coloration retention rate was calculated from the formula: $100\times(D)/(D_0)$.

The results are summarized in Table 3 shown below together with the color optical density. It is required that the coloration retention rate be 60% or more.

TABLE 3

| | 1 | 2 | 3 | 4 | 5 | 6 |
|---|---|---|---|---|---|---|
| Color optical density | 0.3 | 0.7 | 0.6 | 0.7 | 0.75 | 0.5 |
| Coloration retention rate (%) | 10 | 61 | 70 | 75 | 30 | 10 |

As shown in the Table 3 above, the color developing particles Nos. 2 to 4 exhibited excellent properties in terms of both the color optical density and the coloration retention rate. In the color developing particles Nos. 2 to 4, the total amount of the color material containing the color developing compound and the developer is within a range from 41 to 50% by mass, and the amount of the developer is less than the amount of the color developing compound.

In the case of the particles No. 1 where the island portions rich in the color material were not clearly observed, the color optical density was as low as 0.3, and the coloration retention rate was also as low as 10%. Moreover, the glass transition temperature of the color developing particle No. 1 is as low as 60° C.

The coloration retention rates of the color developing particles No. 5 and No. 6 were as low as 30% and 10%, respectively. The cause for this observation is that the total amount of the color material was as large as 70% by mass in the color developing particles No. 5 and the amount of the developer is more than the amount of the color developing compound in the color developing particles No. 6.

Figure 2:
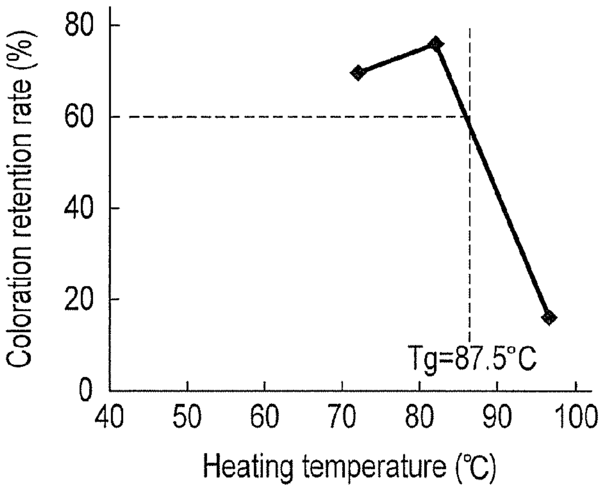
FIG. 2 is a graphic chart showing a relationship between heating temperature and coloration retention rate.

As shown in the graph of FIG. 2, the coloration retention rate tends to reduce as the heating temperature increases. Note that the heating temperature herein refers to a liquid temperature. A coloration retention rate of 60% or more can be ensured as long as the heating temperature is as high as the glass transition temperature (Tg: 87.5° C.)

Figure 3:
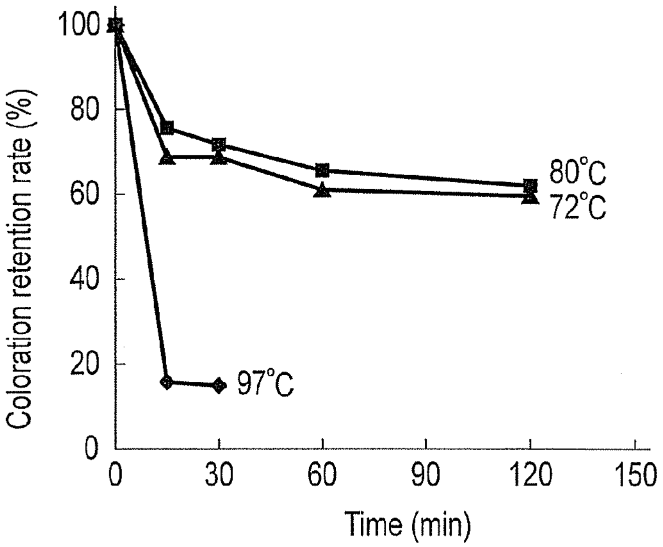
FIG. 3 is a graphic chart showing a relationship between standing time and coloration retention rate.

In addition, as shown in the graph of FIG. 3, the coloration retention rate tends to reduce at an early stage after being left to stand. This tendency of reduction is dependent on the ambient temperature, and a coloration retention rate of 70% or more can be ensured as long as the ambient temperature does not exceed the Tg value. Even if exposed to a high temperature condition of 80° C. for 2 hours, it has been shown that the coloration retention rate tends to become substantially constant without further reduction. Therefore, even under room temperature conditions, it has been expected that the level of coloration can be retained satisfactorily.

The decolorizable color developing particles of the present embodiment are capable of retaining the color optical density at a high level in a favorable manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decolorizable color developing particle comprising:

a color material accounting for 41 to 50% by mass of a total amount and comprising an amount $m_L$ of a color developing compound and an amount $m_D$ ($m_D<m_L$) of a developer; and a binder accounting for a remaining portion, island portions that are rich in the color material being distributed within a sea portion that is rich in the binder, wherein when a radius of the color developing particle is defined as R, and an arbitrary distance from the center is defined as $R_0$ ($R_0<R$), a total area $I_1$ of the island portions and an area $S_1$ of the sea portion within a region having a radius $R_1$ ($R_1>R_0$), and a total area $I_2$ of the island portions and an area $S_2$ of the sea portion within a region having a radius $R_2$ ($R_2<R_0$), satisfy a relationship shown below:

$$(I_1/S_1)<(I_2/S_2).$$

2. The color developing particle according to claim 1, wherein the amount $m_L$ of the color developing compound exceeds 30 mol % and 70 mol % or less.

3. The color developing particle according to claim 1, wherein the amount $m_D$ of the developer is 30 mol % or more and less than 70 mol %.

4. The color developing particle according to claim 1, wherein the amount $m_D$ of the developer is 0.7 to 0.9 times the amount $m_L$ of the color developing compound.

5. The color developing particle according to claim 4, wherein the amount $m_D$ of the developer is 0.75 to 0.8 times the amount mL of the color developing compound.

6. The color developing particle according to claim 1, wherein the distance $R_o$ is 30% or less of R, and $(I_2/S_2)$ is 1.1 to 2.3 times $(I_1/S_1)$.

7. The color developing particle according to claim 1, wherein the distance $R_0$ is 80% or more of R, and $(I_2/S_2)$ is 1.2 to 4.5 times $(I_1/S_1)$.

8. The color developing particle according to claim 1, wherein the color developing particle has a glass transition temperature of 87.5° C. or more.

9. The color developing particle according to claim 1, wherein the color developing compound is Crystal Violet Lactone.

10. The color developing particle according to claim 1, wherein the developer is 2,4-dihydroxybenzophenone.

11. The color developing particle according to claim 1, wherein the binder is a styrene/butadiene copolymer.

12. The color developing particle according to claim 1, wherein the color material accounts for 30 to 70% by mass of a total amount.

13. The color developing particle according to claim 1, wherein the color developing particle has an average particle size of 200 to 400 nm.

* * * * *